United States Patent
Marchini et al.

(10) Patent No.: US 10,759,132 B2
(45) Date of Patent: Sep. 1, 2020

(54) PROCESS AND PLANT FOR BUILDING TYRES

(71) Applicant: PIRELLI TYRE S.P.A., Milan (IT)

(72) Inventors: Maurizio Marchini, Milan (IT); Stefano Sangiovanni, Milan (IT); Pierangelo Misani, Milan (IT); Lothar Brohm, Breuberg (DE)

(73) Assignee: PIRELLI TYRE S.p.A., Milan (IT)

( * ) Notice: Subject to any disclaimer, the term of this patent is extended or adjusted under 35 U.S.C. 154(b) by 302 days.

(21) Appl. No.: 15/524,230

(22) PCT Filed: Oct. 27, 2015

(86) PCT No.: PCT/IB2015/058269
§ 371 (c)(1),
(2) Date: May 3, 2017

(87) PCT Pub. No.: WO2016/075576
PCT Pub. Date: May 19, 2016

(65) Prior Publication Data
US 2017/0368778 A1    Dec. 28, 2017

(30) Foreign Application Priority Data

Nov. 14, 2014    (IT) .............................. MI2014A1967

(51) Int. Cl.
*B29D 30/36*    (2006.01)
*B29D 30/00*    (2006.01)
(Continued)

(52) U.S. Cl.
CPC ........... *B29D 30/36* (2013.01); *B29D 30/005* (2013.01); *B29D 30/245* (2013.01); *B29D 30/32* (2013.01);
(Continued)

(58) Field of Classification Search
CPC .... B29D 30/36; B29D 30/60; B29D 30/0022; B29D 30/0033; B29D 30/0038; B29D 30/0044
(Continued)

(56) References Cited

U.S. PATENT DOCUMENTS

| 4,732,640 A | 3/1988 | Goodfellow |
| 2002/0174939 A1 | 11/2002 | Caretta et al. |

(Continued)

FOREIGN PATENT DOCUMENTS

| CN | 101032864 A | 9/2007 |
| JP | 2006001024 A | 1/2006 |

(Continued)

OTHER PUBLICATIONS

International Search Report form the European Patent Office in corresponding International Application No. PCT/IB2015/058269 dated Apr. 4, 2016.

(Continued)

*Primary Examiner* — Robert C Dye
*Assistant Examiner* — Alexander D Booth
(74) *Attorney, Agent, or Firm* — Finnegan, Henderson, Farabow, Garrett & Dunner, L.L.P.

(57) ABSTRACT

A plant for building tyres, includes: a shaping work station configured for receiving a carcass sleeve; at least one radially expandable/contractible toroidal forming drum engageable in the shaping work station; at least one work station configured for building at least one component of a crown structure on a radially external surface of a tyre being processed, defined starting from the carcass sleeve that is shaped and coupled to the forming drum; transfer devices configured for moving said forming drum along a closed-loop completion path and arranging it in proximity to the work station in order to obtain a green tyre, the closed-loop (Continued)

completion path being extended from an initial work station to a final work station coinciding with the shaping work station; and a pick-up device configured for picking up said green tyre decoupled from the respective forming drum.

35 Claims, 9 Drawing Sheets

(51) Int. Cl.
   *B29D 30/24* (2006.01)
   *B29D 30/32* (2006.01)
   *B29D 30/16* (2006.01)
(52) U.S. Cl.
   CPC ............... *B29D 2030/0022* (2013.01); *B29D 2030/1664* (2013.01)
(58) Field of Classification Search
   USPC .............................................. 156/111, 396
   See application file for complete search history.

(56) References Cited

U.S. PATENT DOCUMENTS

| | | | |
|---|---|---|---|
| 2006/0096695 A1 | 5/2006 | Caretta et al. | |
| 2006/0108051 A1 | 5/2006 | Lacagnina | |
| 2006/0130959 A1 | 6/2006 | Lacagnina | |
| 2007/0068617 A1* | 3/2007 | De Paoli | B29D 30/0016 156/111 |
| 2007/0209760 A1* | 9/2007 | Hwang | B29D 30/005 156/397 |
| 2007/0295442 A1* | 12/2007 | Minakawa | B23Q 7/03 156/111 |
| 2008/0017298 A1* | 1/2008 | Iyanagi | B29D 30/245 156/131 |
| 2009/0020200 A1 | 1/2009 | Ogawa et al. | |
| 2010/0032864 A1* | 2/2010 | Marchini | B29D 30/10 264/241 |
| 2010/0243129 A1* | 9/2010 | Mirto | B29D 30/005 156/111 |
| 2010/0307662 A1* | 12/2010 | Mancini | B29D 30/246 156/111 |
| 2013/0276956 A1* | 10/2013 | Cantu | B29D 30/14 156/117 |
| 2014/0166189 A1* | 6/2014 | Currie | B29D 30/0016 156/111 |

FOREIGN PATENT DOCUMENTS

| | | | |
|---|---|---|---|
| JP | 2013-514909 | 5/2013 | |
| JP | 2014-117956 | 6/2014 | |
| RU | 2 490 131 C2 | 8/2013 | |
| RU | 2012131154 A | 1/2014 | |
| WO | WO 2004/041520 A1 | 5/2004 | |
| WO | WO 2004/041522 A1 | 5/2004 | |
| WO | WO-2004041520 A1 * | 5/2004 | ......... B29D 30/0016 |
| WO | WO 2011/077236 A1 | 6/2011 | |
| WO | WO 2014/083513 A1 | 6/2014 | |

OTHER PUBLICATIONS

Written Opinion of the International Searching Authority from the European Patent Office in corresponding International Application No. PCT/IB2015/058269, dated Apr. 4, 2016.

Notification of First Office Action dated Oct. 22, 2018, issued by the State Intellectual Property Office of the People's Republic of China in counterpart Chinese Patent Application No. 201580054846.6.

Russian Office Action and Search Report dated Apr. 2, 2019, from the Federal Service for Intellectual Property, in counterpart Russian Application No. 2017115478. (7 pages, 6 pages translated).

Office Action and Search Report from the Brazilian Patent Office in counterpart Brazilian Application No. BR112017006535, dated Feb. 6, 2020.

Indonesian Office Action and Search Report dated Aug. 27, 2019, from the Indonesian Directorate General of Intellectual Property, in counterpart Indonesian Application No. P00201702246.

Notice of Reasons for Rejection, Japanese Application No. JP 2017-512663 (Nov. 19, 2019).

* cited by examiner

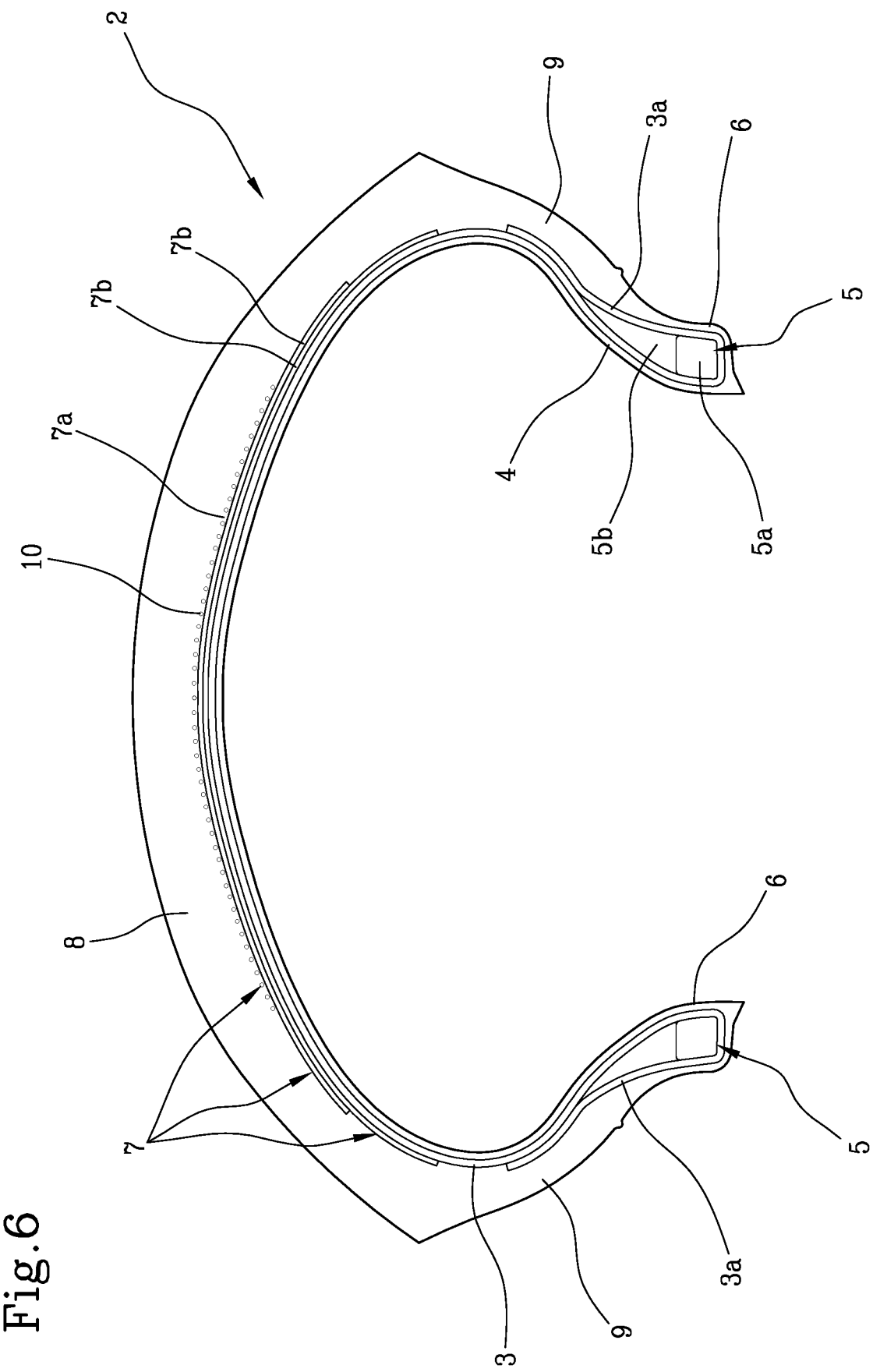

PROCESS AND PLANT FOR BUILDING TYRES

CROSS REFERENCE TO RELATED APPLICATIONS

This application is a national phase application based on PCT/IB2015/058269, filed Oct. 27, 2015, and claims the priority of Italian Patent Application No. MI2014A001967, filed Nov. 14, 2014, the content of each application being incorporated herein by reference.

BACKGROUND OF THE INVENTION

Field of the Invention

The present invention relates to a process and a plant for building tyres.

More particularly, the invention is intended for the process and equipment used for building the green tyre, to be subsequently subjected to a vulcanisation cycle for the obtainment of the final product.

Description of the Related Art

A tyre for vehicle wheels generally comprises a carcass structure comprising at least one carcass ply having respectively opposite end flaps engaged with respective anchoring annular structures, integrated in the zones normally identified with the term "beads", having an inner diameter substantially corresponding to a so-called "fitting diameter" of the tyre on a respective mounting rim.

The carcass structure is associated with a belt structure which can comprise one or more belt layers, radially superimposed with respect to each other and with respect to the carcass ply, having textile or metallic reinforcement cords with crossed orientation and/or substantially parallel to the circumferential extension direction of the tyre (zero-degree layer). In radially external position with respect to the belt structure, a tread band is applied, it too made of elastomeric material like other constituent semi-finished products of the tyre.

Respective sidewalls made of elastomeric material are also applied in axially external position on the lateral surfaces of the carcass structure, each extended from one of the lateral edges of the tread band to the respective anchoring annular structure to the beads. In the tyres of "tubeless" type, an air-impermeable covering layer, normally termed "liner", covers the internal surfaces of the tyre.

Following the building of the green tyre actuated by means of assembly of respective components, a moulding and vulcanisation treatment is generally executed aimed to determine the structural stabilisation of the tyre by means of cross-linking of the elastomeric compositions as well as impart thereon, if requested, a desired tread design and possible distinctive graphic marks at the sidewalls of the tyre.

By 'tyre for two-wheel vehicles', in particular motorcycles, it is intended a tyre whose curvature ratio is approximately comprised between about 0.15 and about 0.45.

By 'curvature ratio relative to a tyre' (or to a portion thereof) it is intended the ratio between the distance of the radially external point of the tread band (or of the external surface) from the line passing through the laterally opposite ends of the tread itself (or of the external surface itself), measured on a radial plane of the tyre (or of said portion thereof) or on a plane containing the rotation axis thereof, and the distance measured along the chord of the tyre (or of a portion thereof) between said ends.

By 'curvature ratio relative to a forming drum' it is intended the ratio between the distance of the radially external point of the external surface of the drum from the line passing through the laterally opposite ends of the drum itself, measured on a radial plane of the drum, or on a plane containing the rotation axis thereof, and the distance measured along the chord of the drum between said ends.

With the expression "elastomeric material" it is intended to indicate a composition comprising at least one elastomeric polymer and at least one reinforcement filler. Preferably, such composition also comprises additives such as a cross-linking agent and/or a plasticizer. Due to the presence of the cross-linking agent, by means of heating such material can be cross-linked, so as to form the final manufactured product.

With the expression "carcass sleeve" it is intended the carcass structure in substantially cylindrical form comprising at least one carcass ply and a pair of anchoring annular structures. In other words, this is the carcass structure at the end of its building on a substantially cylindrical drum and before the shaping into toroidal form.

With the expression "crown structure" it is intended at least the set formed by a belt structure and tread band. At least one portion of the sidewalls can be associated with this set.

With the expression "tyre being processed" it is intended the toroidally-shaped carcass sleeve coupled to the forming drum, comprising or not comprising the sequence of components of the crown structure that were built starting from the radially external surface of the carcass sleeve, hence of the tyre being processed itself. In other words the tyre being processed is a developing set starting from the toroidally-shaped carcass sleeve, and coupled to the forming drum.

With the expression "closed-loop completion path" it is intended a closed path, not necessarily circular, comprising at least one work station, preferably a plurality of work stations, in which the initial work station coincides with the final work station.

With the expression "green tyre" it is intended a tyre obtained at the end of the building process and not yet moulded and vulcanised.

With the term "strip-like element" it is intended an elongated manufactured product, cut to size in a manner so as to have a length thereof greater than a width thereof, having a cross section profile with flattened shape and comprising one or more cords generally made of textile and/or metallic material, extended parallel to the length and to the longitudinal extension of the strip-like element itself and incorporated or at least partially covered by at least one layer made of elastomeric material.

With the expression "continuous elongated element", it is intended an elongated manufactured product made only of elastomeric material or comprising at least one cord made of textile and/or metallic material extended parallel to the longitudinal extension of the continuous elongated element itself and incorporated or at least partially covered by at least one layer made of elastomeric material.

In the document WO 2004/041520, on behalf of the same Applicant, the shaping drum can be carried by a robotic arm which interacts with a transfer member carrying the belt structure picked up from an auxiliary drum, in order to determine the coupling between the carcass structure and the belt structure. The robotic arm then carries the shaping drum in proximity to devices for applying the tread band and/or the sidewalls comprising supply members arranged for laying a continuous elongated element made of elastomeric material on the mutually coupled carcass and belt structure.

The document WO 2004/041522 illustrates a further example in which a shaping drum carried by a robotic arm is moved in order to interact with devices that complete the obtainment of the green tyre after having caused the application of a belt structure previously formed on an auxiliary drum.

US 2009/0020200 describes the obtainment of a tyre for two-wheel vehicles, in which a tread band is obtained by continuously winding as a spiral a continuous elongated element made of elastomeric material, in the circumferential direction of the tyre being processed, supported by a rigid drum whose external surface profile replicates the internal surface profile of the tyre being processed.

The Applicant has verified that in the execution of the obtainment modes of the type illustrated in WO 2004/041520 or WO 2004/041522, it may be difficult to ensure a correct mutual positioning between the crown structure comprising at least one belt layer and the carcass structure in the initial carcass sleeve form. The Applicant has perceived that this circumstance is particularly but not exclusively evident in the obtainment of tyres with a high curvature ratio, as is for example typically found in tyres for two-wheel vehicles.

SUMMARY OF THE INVENTION

The Applicant has also verified that the use of a substantially rigid toroidal forming drum and with fixed geometry of the type described in US 2009/0020200 tends to introduce process difficulties and criticalities, also involving significant logistical complications with regard to equipment and spaces required for the installation of the production plants.

In particular, the Applicant has also observed that the current need to have limited production spaces is a requirement substantially equivalent to high automation, to process repeatability and to execution precision of the processes in order to obtain finished tyres increasingly close to design specifications, with shorter cycle times and lower costs.

The Applicant has thus perceived that in order to avoid significant logical complications with regard to equipment and spaces required for the installation of the production plants, it is opportune to operate with a plant lay-out that as much as possible reproduces a closed circuit.

The Applicant has therefore perceived that by obtaining the components of the crown structure directly on the carcass sleeve shaped according to the desired configuration thereof in the built green tyre, it is possible to ensure greater geometric and structure precision of the single components, and an optimal positioning of each of these components with respect to other components of the tyre.

The Applicant has finally found that by coupling, in a shaping work station, a toroidal forming drum of expandable/contractible type to a substantially cylindrical toroidally-shaped carcass sleeve, and by subsequently executing the laying of the crown structure directly on the tyre being processed, i.e. on the radially external surface of the aforesaid carcass sleeve, along a closed-loop completion path from and to the shaping work station, it is possible to obtain tyres with limited cycle times whose structural elements are in accordance with precise design specifications, maintaining lay-out of the plant compact.

In accordance with a first aspect, the present invention relates to a process for building tyres.

Preferably provision is made for arranging a carcass sleeve in a shaping work station.

Preferably provision is made for toroidally shaping said carcass sleeve and coupling it to a radially expandable/contractible toroidal forming drum defining a tyre being processed.

Preferably provision is made for moving said forming drum along a closed-loop completion path having an initial work station and a final work station coinciding with said shaping work station.

Preferably provision is made for building, along said closed-loop completion path, each component of a corresponding crown structure of the tyre being processed in radially external position with respect to the aforesaid tyre being processed, obtaining a green tyre.

Preferably provision is made for decoupling said green tyre from said forming drum.

Preferably provision is made for picking up said green tyre.

In accordance with a second aspect, the present invention relates to a plant for building tyres.

Preferably provision is made for a shaping work station configured for receiving a carcass sleeve.

Preferably provision is made for at least one radially expandable/contractible toroidal forming drum engageable in the shaping work station.

Preferably provision is made for at least one work station configured for building at least one portion of a component of a crown structure on a radially external surface of a tyre being processed, defined starting from the carcass sleeve that is shaped and coupled to the forming drum. Preferably provision is made for transfer devices configured for moving said forming drum along a closed-loop completion path and arranging it in sequence in proximity to said at least one work station in order to obtain a green tyre, said closed-loop completion path being extended from an initial work station to a final work station coinciding with said shaping work station.

Preferably provision is made for a pick-up device configured for picking up said green tyre decoupled from the respective forming drum.

The Applicant deems that in such a manner, tyres are obtained in plants with high automation, with reduced cycle times and spaces, in which the structural elements of each built tyre are accurately in accordance with the design specifications.

In one or more of the above-indicated aspects, the present invention can comprise one or more of the following characteristics.

Preferably, the action of decoupling said green tyre from said forming drum occurs in said shaping work station, at the end of the closed-loop completion path completed by said forming drum.

Preferably, the action of picking up said green tyre occurs in said shaping work station.

Preferably provision is made for arranging, in said shaping work station, said radially-contracted forming drum.

Preferably provision is made for radially expanding said forming drum.

Preferably provision is made for coupling said toroidally-shaped carcass sleeve to the radially-expanded forming drum.

Preferably provision is made for coaxially fitting said carcass sleeve in radially external position with respect to said radially-contracted forming drum arranged in said shaping work station, before radially expanding said forming drum.

Preferably said toroidally-shaped carcass sleeve is moved along said closed-loop completion path coupled to said radially-expanded forming drum.

Preferably provision is made for radially contracting said forming drum in order to decouple said green tyre.

Preferably, along said closed-loop completion path, said tyre being processed is arranged in proximity to a plurality of work stations, each work station being configured for building at least one portion of a component of said crown structure.

Preferably said component of the crown structure is at least one from among:
a component of a belt structure;
a tread band;
a sidewall.

Preferably at least one component of said crown structure is built by winding at least one continuous elongated element according to circumferential coils that are axially approached and/or radially superimposed around a radially external surface of the tyre being processed.

Still more preferably said component is at least one from among:
a zero-degree layer belonging to a belt structure;
at least one portion of a tread band;
a sidewall.

Preferably a component of said crown structure is built by laying a plurality of strip-like elements in a mutually approached relationship of the relative lengths, in a manner such that the longitudinal extension of each strip-like element is arranged transverse to the circumferential extension of a radially external surface of the tyre being processed, said plurality of strip-like elements defining said component covering the entire circumferential extension of the tyre being processed.

Still more preferably said component is at least one belt layer belonging to a belt structure.

Preferably provision is made for moving, along at least one section of said closed-loop completion path, an exiting forming drum that is not coupled to a tyre being processed.

Preferably provision is made for moving away, from the closed-loop completion path, said exiting forming drum and inserting in said closed-loop completion path an entering forming drum in substitution.

Still more preferably a same transfer device is configured for moving said exiting forming drum away from the closed-loop completion path and for inserting said entering forming drum in substitution in said closed-loop completion path.

Preferably said exiting forming drum is moved away, during the travel along the closed-loop completion path immediately before the shaping work station, according to a travel sense of the closed-loop completion path and said entering forming drum in substitution is inserted in said closed-loop completion path at said shaping work station.

Preferably provision is made for arranging a platform adapted to receive a plurality of entering forming drums in a substitution work station arranged in proximity to said closed-loop completion path.

Preferably provision is made for automatically moving said platform from a waiting work station to said substitution work station.

Preferably the expanded forming drum has a curvature ratio comprised between about 0.15 and about 0.45.

Preferably provision is made for arranging a further carcass sleeve in the shaping work station after the green tyre has been decoupled from said forming drum and picked up.

Preferably provision is made for toroidally shaping said further carcass sleeve and coupling it to said forming drum in the shaping work station in order to obtain a further tyre being processed.

Preferably provision is made for moving said forming drum once again along said closed-loop completion path.

Preferably provision is made for building, along said closed-loop completion path, each component of a corresponding crown structure of the further tyre being processed in radially external position with respect to the aforesaid further tyre being processed.

Preferably, said pick-up device is configured for picking up said green tyre from the shaping work station, at the end of the closed-loop completion path completed by said forming drum.

Preferably provision is made for actuator devices operating in the shaping work station in order to radially expand the forming drum inside the carcass sleeve and in order to radially contract the forming drum inside the green tyre.

Preferably provision is made for a load device configured for arranging said carcass sleeve in said shaping work station.

Preferably provision is made for a substitution work station of the forming drums arranged in proximity to said closed-loop completion path and adapted to provide at least one entering forming drum in substitution and to receive at least one exiting forming drum.

Preferably a same transfer device is configured for moving away said exiting forming drum from the closed-loop completion path by positioning it in the substitution work station and for inserting said entering forming drum in said closed-loop completion path by picking it up from said substitution work station.

Preferably said substitution work station is arranged immediately before the shaping work station according to a travel sense of the closed-loop completion path.

Preferably provision is made for a platform adapted to receive a plurality of entering forming drums in said substitution work station.

Preferably provision is made for actuators configured for automatically moving said platform from a waiting work station to said substitution work station.

Preferably said at least one work station comprises at least one building device selected from among:
a zero-degree layer building device,
a belt layer building device,
a first tread band portion building device,
a second tread band portion building device,
a third tread band portion building device,
a sidewall building device,
a label building device.

Preferably said at least one work station comprises a zero-degree layer building device comprising a spiraling unit configured for winding a rubber-covered cord or a continuous elongated reinforcement element according to circumferential coils that are axially approached in mutual contact, in radially external position around the tyre being processed, while the forming drum is driven in rotation and suitably moved in order to distribute the circumferential coils according to a predefined scheme.

Preferably said at least one work station comprises a building device selected from among: a first tread band portion building device, a second tread band portion building device, a third tread band portion building device, a sidewall building device; each said building device comprising a spiraling unit configured for winding at least one continuous elongated element made of elastomeric material according to circumferential coils that are axially approached in mutual contact and/or radially superimposed, in radially external position around the tyre being processed, while the forming drum is driven in rotation and suitably moved in order to distribute the circumferential coils according to a predefined scheme.

Preferably said at least one work station comprises a belt layer building device comprising a deposition unit configured for laying a plurality of strip-like elements in a mutually approached relationship of the relative lengths, in a manner such that the longitudinal extension of each strip-like element is arranged transverse to the circumferential extension of the radially external surface of the tyre being processed and that the plurality of strip-like elements defines a belt layer covering the entire circumferential extension of the tyre being processed.

Preferably the deposition unit is configured for building a plurality of belt layers by arranging the strip-like elements crossed with respect to the previously-built belt layer.

Preferably said transfer devices comprise at least one anthropomorphic robotic arm.

Preferably said transfer devices comprise at least one translator.

Further characteristics and advantages will be clearer from the detailed description of a preferred but not exclusive embodiment of a process and a plant for obtaining tyres, in accordance with the present invention.

BRIEF DESCRIPTION OF THE DRAWINGS

Such description will be set forth hereinbelow with reference to the enclosed drawings, provided only as a non-limiting example, in which:

FIG. 6 schematically shows, in radial half-section, a tyre obtainable in accordance with the present invention;

DETAILED DESCRIPTION OF THE INVENTION

Figure 1:
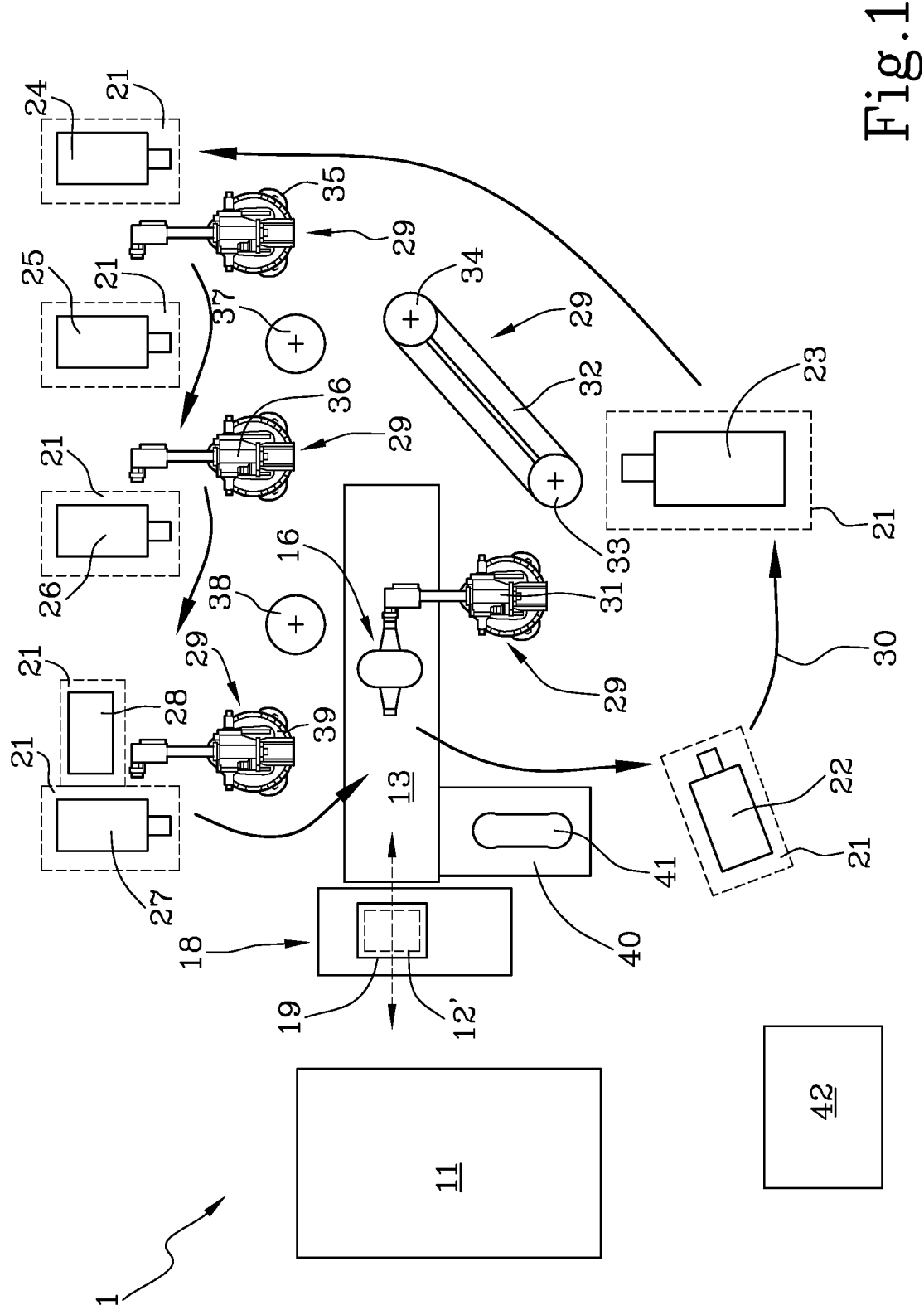
FIG. 1 schematically shows a top view of a plant for building tyres in accordance with the present invention.

With reference to the abovementioned figures, reference number 1 overall indicates a plant for building tyres for vehicle wheels, arranged for actuating a process according to the present invention.

The plant 1 is set for manufacturing tyres 2 (FIG. 6) essentially comprising at least one carcass ply 3 preferably internally covered by a layer of impermeable elastomeric material or so-called liner 4. Two anchoring annular structures 5, each comprising a so-called bead core 5a preferably carrying an elastomeric filler 5b in radially external position, are engaged to respective end flaps 3a of the carcass ply/plies 3. The anchoring annular structures 5 are integrated in proximity to zones normally identified with the term "beads" 6, at which the engagement between the tyre 2 and a respective mounting rim (not depicted) normally occurs.

A belt structure 7 is circumferentially applied around the carcass ply/plies 3, and a tread band 8 is circumferentially superimposed on the belt structure 7.

The tread band 8 can be obtained by putting together two or more separately-built portions. In particular, the tread band can be the composition of one, two or three portions 8a-8c of tread band 8 (FIGS. 7 and 8) which, for illustration simplicity, will be indicated as first tread band portion 8a, second tread band portion 8b, third tread band portion 8c. The indication "first", "second" and "third" implies neither a time nor a spatial succession, and in one tread only one of the portions or any two portions may be provided, for example the second and third or the first and third, as will be subsequently described.

Two sidewalls 9, each extended from the corresponding bead 6 to a corresponding lateral edge of the tread band 8, are applied in laterally opposite positions on the carcass ply/plies 3.

The belt structure 7 can comprise a zero-degree layer 7a and/or one or more belt layers 7b. The zero-degree layer 7a comprises circumferential coils 10 of a continuous elongated element reinforced with one or more metallic or textile cords, the aforesaid coils 10 being axially approached and substantially parallel to the circumferential extension direction of the tyre. The belt layer(s) 7b can comprise parallel metallic or textile cords, arranged according to an orientation tilted with respect to the circumferential extension direction of the tyre, respectively crossed between belt layers 7b that are adjacent to each other. In FIG. 6, a tyre embodiment has been illustrated comprising a zero-degree layer 7a and multiple belt layers 7b (in particular two belt layers 7b) that are radially internal with respect to the zero-degree layer 7a. According to an alternative non-illustrated embodiment, the tyre 2 can comprise a zero-degree layer 7a and one or more belt layers 7b arranged radially external with respect to the zero-degree layer 7a.

The zero-degree layer 7a and/or the belt layer(s) 7b are components of the belt structure 7.

The set formed by the belt structure 7, in particular by its components, and by the tread band 8, possibly with the association of at least one portion of the sidewalls 9, constitutes a so-called "crown structure" of the tyre 2. In other words, the components of the belt structure 7, the tread band 8 (preferably the portions that compose it) and possibly at least one portion of the sidewalls 9 define examples of components of the crown structure.

The plant 1 illustrated in FIG. 1 comprises a carcass building line 11 having one or more building stations, not illustrated, where, according to known modes, the manufacturing of a carcass sleeve 12 (FIGS. 2-3) is executed, such sleeve having substantially cylindrical shape. According to an alternative embodiment, for example illustrated in FIG. 1a, the carcass building line is remote with respect to the rest of the plant 1 that will be described hereinbelow. In this case, a carcass 11a storage can be provided coming from the remote carcass building line.

The carcass sleeve 12 comprises at least one carcass ply 3, preferably internally covered by the liner 4, and having the respective end flaps 3a engaged, for example by turning up, with the respective anchoring annular structures 5. If necessary, the carcass sleeve 12 can also comprise the sidewalls 9 or first portions thereof, each extended starting from a respective bead 6.

The carcass building line 11 and/or the carcass storage 11a leads to a shaping work station 13 configured for receiving the carcass sleeve 12. In addition, the shaping work station 13 is configured for toroidally shaping the carcass sleeve 12.

In particular the shaping work station 13 comprises devices 14 for engaging the carcass sleeve 12 which retain the carcass sleeve 12 and shaping devices 15, upon whose action the carcass sleeve 12 retained by the engagement devices 14 is shaped according to a toroidal configuration.

The engagement devices 14 are preferably configured for retaining the carcass sleeve 12 at the beads 6 and at their interior.

The shaping devices 15 can for example comprise a fluid-dynamic circuit (not illustrated) for introducing pressurized air or another operating inflation fluid inside the carcass sleeve 12.

The plant 1 comprises at least one radially expandable/contractible toroidal forming drum 16. The forming drum 16 is engageable in the shaping work station 13. More particularly, provision is preferably made such that the forming drum 16 is initially projectingly supported in the shaping work station 13, as for example illustrated in FIG. 2.

In particular the forming drum 16 is expandable between a first operative condition, in which the forming drum 16 is radially contracted (FIGS. 2 and 3), and a second operative condition, in which the forming drum is radially expanded (FIGS. 4 and 5), and vice versa.

Preferably the shaping work station 13 comprises actuator devices 17 operating in the shaping work station 13 itself in order to radially expand the forming drum 16, in particular when arranged inside the carcass sleeve 12. Preferably the same actuator devices 17 are actuatable in order to radially contract the forming drum 16.

In the second operative condition, i.e. when the forming drum 16 is expanded, the forming drum 16 defines, along its circumferential extension, a radially external toroidal surface "S" (FIG. 4), not necessarily continuous, shaped according to the internal configuration that one part of the carcass sleeve 12 must assume upon completed shaping. More in detail, provision may advantageously be made such that the expanded forming drum 16 has a curvature ratio comprised between about 0.15 and about 0.45, typically suitable for obtaining tyres for motorcycles or other two-wheel vehicles. If necessary, curvature ratios may still be employed with values lower than those indicated above, for example suitable for producing car or truck tyres.

In accordance with one possible embodiment, the plant 1 comprises a load device 18 configured for arranging the carcass sleeve 12 in the shaping work station 13. In particular, by means of the load device 18, the carcass sleeve 12 coming from the carcass building line 11 or from the storage 11a is then transferred into the shaping work station 13 in order to be coaxially arranged in radially external position around the radially-contracted forming drum 16.

The load device 18 can for example comprise at least one load handling device 19 preferably operating on an external surface of the carcass sleeve 12.

Following the toroidal shaping of the carcass sleeve 12, this is coupled to the radially-expanded forming drum 16 defining a tyre being processed 20. The modes of such coupling according to one possible embodiment will be subsequently described.

The shaped carcass sleeve 12 and the radially-expanded forming drum 16 in a mutual coupling relationship are adapted to be subjected to the action of at least one work station 21 of the plant 1 configured for building at least one component of the crown structure on a radially external surface S' (FIG. 4) of the tyre being processed 20. The component of the crown structure is at least one from among:
a component of the belt structure 7, for example the zero-degree layer 7a and/or the belt layer(s) 7b;
the tread band 8;
one or both sidewalls 9.

According to one possible embodiment, the plant 1 comprises a plurality of work stations 21. Each work station 21 can comprise a building device, for example selected from among:
a zero-degree layer building device 22,
a belt layer building device 23,
a first tread band portion building device 24,
a second tread band portion building device 25,
a third tread band portion building device 26,
a sidewall building device 27,
a label building device 28.

Figure 1A:
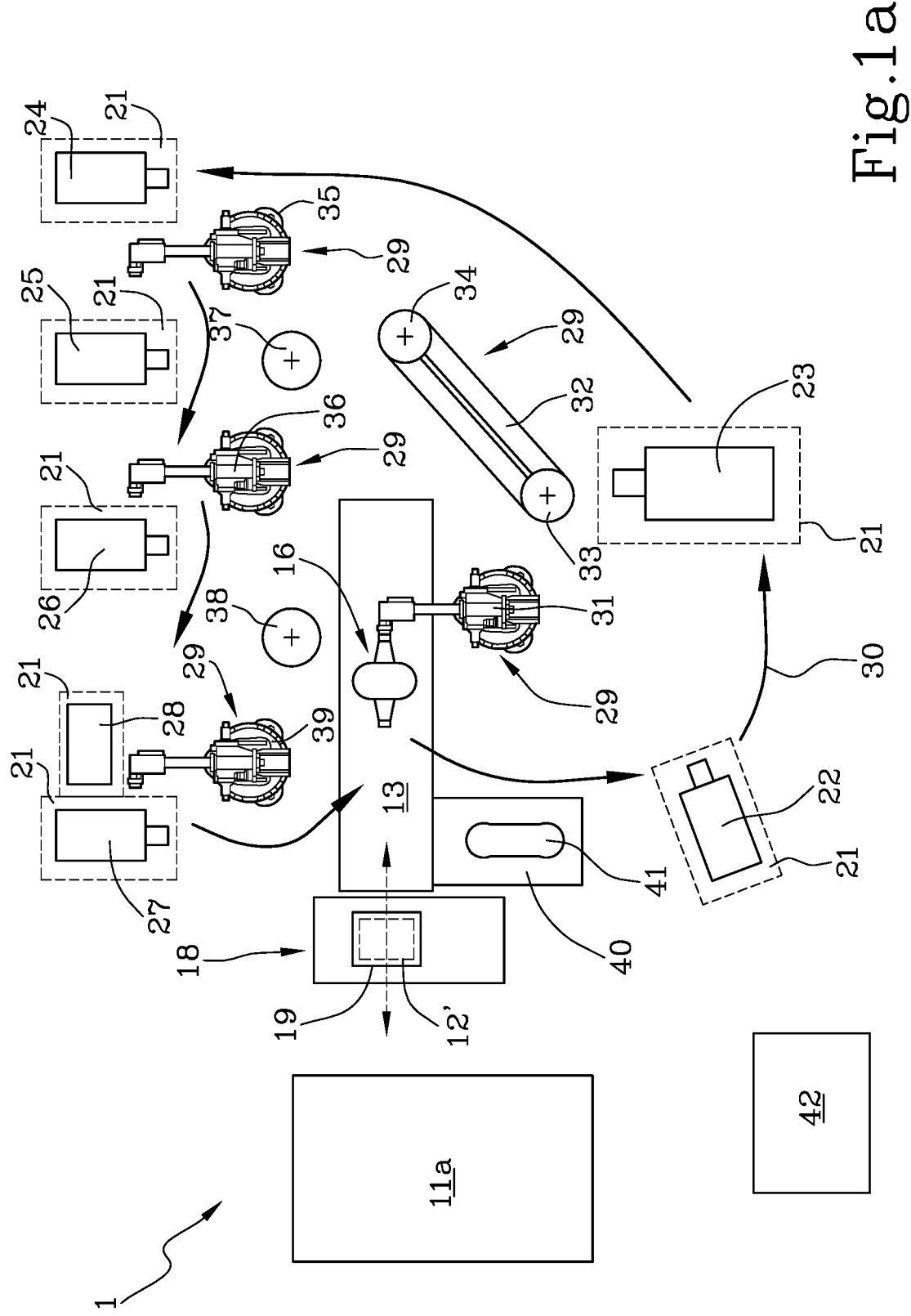
FIG. 1a schematically shows a top view of a variant of the plant for building tyres of FIG. 1.

In FIGS. 1 and 1a, a plant embodiment has been illustrated comprising all the above-listed building devices.

The zero-degree layer building device 22 can for example comprise a distributor which supplies at least one rubber-covered cord or another continuous elongated reinforcement element made of textile or metallic material. In particular, the zero-degree layer building device 22 can for example comprise a spiraling unit configured for winding the rubber-covered cord or the continuous elongated reinforcement element according to circumferential coils that are axially approached in mutual contact, in radially external position around the tyre being processed, while the forming drum 16 is driven in rotation and suitably moved in order to distribute the circumferential coils according to a predefined scheme.

The belt layer building device 23 can for example comprise a deposition unit configured for laying a plurality of strip-like elements in a mutually approached relationship of the relative lengths, in a manner such that the longitudinal extension of each strip-like element is arranged transverse to the circumferential extension of the radially external surface of the tyre being processed 20 and that the plurality of strip-like elements defines a belt layer 7b covering the entire circumferential extension of the tyre being processed 20. The deposition unit may possibly be configured for building a plurality of belt layers 7b by arranging the strip-like elements crossed with respect to the previously-built belt layer 7b.

The device for building a first or second or third tread band portion (24-26) can for example comprise a spiraling unit configured for winding at least one continuous elongated element made of elastomeric material according to circumferential coils that are axially approached in mutual contact and/or radially superimposed, in radially external position around the tyre being processed 20, in particular around the belt structure 7 or a previously-built tread portion, while the forming drum 16 is driven in rotation and suitably moved in order to distribute the circumferential coils according to a predefined scheme.

The sidewall building device 27 can comprise a spiraling unit configured for winding at least one continuous elongated element made of elastomeric material according to circumferential coils that are axially approached in mutual contact and/or radially superimposed, in radially external position around the tyre being processed 20, while the forming drum 16 is driven in rotation and suitably moved in order to distribute the circumferential coils according to a predefined scheme. In particular the spiraling unit arranges the sidewalls against axially opposite lateral portions of the carcass sleeve 12.

The plant 1 can comprise both the zero-degree layer building device 22 and the belt layer building device 23, as illustrated in FIGS. 1 and 1a, or only the zero-degree layer building device 22 or only the belt layer building device 23, as a function of the type of tyre to be built. If both are provided, both can be activated in the same process or selectively, always as a function of the type of tyre to be built.

Provision can also be made for multiple work stations 21, each comprising a belt layer building device 23.

Figure 8:
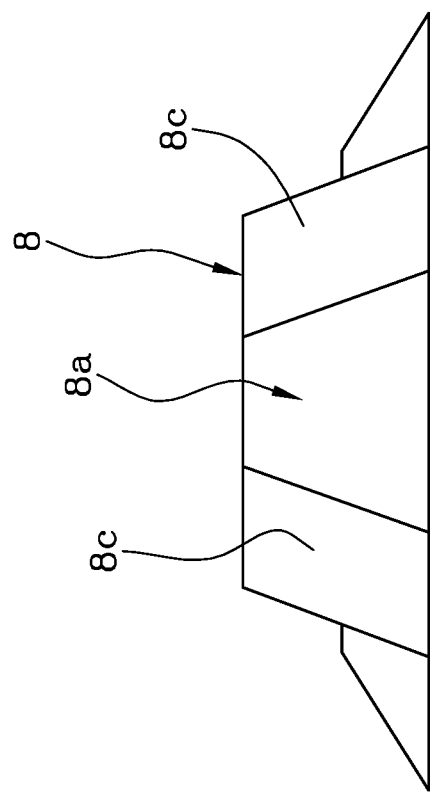
FIG. 7 and FIG. 8 respectively schematically show a tread band, according to two possible embodiments.
Figure 7:
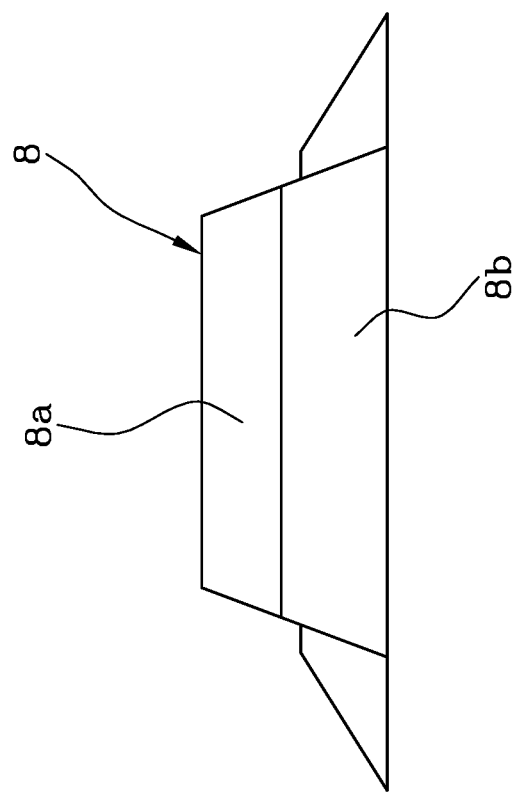

The plant 1 can comprise the first tread band portion building device 24, the second tread band portion building device 25, and the third tread band portion building device 26 as illustrated for example in FIGS. 1 and 1a. Each building device of the three aforesaid is activatable for building a corresponding portion 8a-8c of tread band 8. In FIG. 7, an embodiment is reported of tread band 8 comprising two portions, e.g. the first portion 8a and the second portion 8b. In this case of the three above-indicated building devices, the first tread band portion building device 24 and the second tread band portion building device 25 will be activated. In FIG. 8, a further tread band 8 embodiment is reported, such tread band 8 comprising three portions, e.g. the first portion 8a and two third portions 8c. In this case of the three above-indicated building devices, the first tread band portion building device 24 and the third tread band portion building device 26 will be activated. Further combinations are possible, with only one of the tread band portions, with any two of the tread band portions or with all three tread band portions 8a-8c, according to any one type of mutual arrangement. In the case of a different number of possible tread band portions, also the number of the respective building devices can vary.

In accordance with a possible embodiment, the plant 1 comprises transfer devices 29 configured for moving the forming drum 16 along a closed-loop completion path 30 and arranging it in proximity to the work station(s) 21. In FIGS. 1 and 1a, an example is indicated of a closed-loop completion path 30 suitable for manufacturing a tyre with a zero-degree layer 7a, at least one belt layer 7b, a tread band 8 comprising the first portion 8a and the third portions 8c (as is for example illustrated in FIG. 8), the sidewalls 9 and labelling.

The closed-loop completion path 30 is extended from an initial work station to a final work station coinciding with the shaping work station 13. According to one possible embodiment illustrated for example in FIG. 1 or 1a, the transfer devices 29 comprise a first robotic arm 31, preferably anthropomorphic, configured for transferring the tyre being processed 20 from the shaping work station 13 to the first of the work stations 21 that the tyre being processed 20 encounters. Preferably the first robotic arm 31 is configured for engaging the forming drum 16 at an axial end thereof. Still more preferably the first robotic arm 31 is configured for driving in rotation the forming drum 16 during the building of a component of the crown structure.

For example, the first robotic arm 31 is configured for transferring the tyre being processed 20 from the shaping work station 13 to that comprising the zero-degree layer building device 22 or the belt layer building device(s) 23.

The belt layer(s) 7b can be built before or after the building of the zero-degree layer 7a. The building of the zero-degree layer 7a and of the belt layer(s) 7b will be subsequently described.

If both the zero-degree layer building device 22 and the belt layer building device(s) 23 are provided, the movement of the forming drum 16 therebetween can be entrusted to the same first robotic arm 31, or to a second anthropomorphic robotic arm or handling device of another type, not illustrated.

According to one possible embodiment illustrated for example in FIG. 1 or 1a, the transfer devices 29 comprise a translator 32 configured for example for transferring the tyre being processed 20 from the work station 21 comprising the zero-degree layer building device 22 or the belt layer building device(s) 23 to the successive work station, for example comprising the first tread band portion building device 24. Preferably the translator 32 is configured for engaging the forming drum 16 arranged with vertical axis, at an axial end thereof. Preferably the translator 32 is configured for engaging the forming drum 16 starting from a first passage station 33 and transferring it to a second passage station 34.

According to one possible embodiment illustrated for example in FIG. 1 or 1a, the transfer devices 29 can comprise a second robotic arm 35 and a third robotic arm 36, both preferably anthropomorphic, configured for transferring the tyre being processed 20 from the second passage station 34 to the work station 21 comprising one of the devices for building a first or second or third tread band portion (24-26). Preferably the second robotic arm 35 and/or the third robotic arm 36 is/are configured for engaging the forming drum 16 at an axial end thereof.

Still more preferably, the second robotic arm 35 and/or the third robotic arm 36 is/are configured for driving in rotation the forming drum 16 during the building of a component of the crown structure.

For example, the second robotic arm 35 is configured for transferring the tyre being processed 20 from the second passage station 34 to the work station 21 comprising the first tread band portion building device 24 and/or to that comprising the second tread band portion building device 25. For example, the third robotic arm 36 is configured for transferring the tyre being processed 20 from a third passage station 37, in which it is left by the second robotic arm 35, to the work station 21 comprising the second tread band portion building device 25 and/or to that comprising the third tread band portion building device 26, before then releasing it at a fourth passage station 38.

According to one possible embodiment illustrated for example in FIG. 1 or 1a, the transfer devices 29 can comprise a fourth robotic arm 39, preferably anthropomorphic, for transferring the tyre being processed 20 from the fourth passage station 38 to the work station 21 comprising the sidewall building device 27. Preferably the fourth robotic arm 39 is configured for engaging the forming drum 16 at an axial end thereof. Still more preferably the fourth robotic arm 39 is configured for driving in rotation the forming drum 16 during the building of a component of the crown structure.

For example, the same fourth robotic arm 39 is configured for transferring the tyre being processed 20 from the work station 21 comprising the sidewall building device 27 to the work station 21 comprising the label building device 28.

Possibly, the sequence of building of the sidewalls and the labelling can be reversed, so that the fourth robotic arm 39 transfers the tyre being processed 20 from the fourth passage station 38 to the work station 21 comprising the label building device 28 and subsequently to the work station 21 comprising the sidewall building device 27.

For example, the same fourth robotic arm 39 is configured for transferring the tyre being processed 20 to the shaping work station 13, closing the closed-loop completion path 30.

According to one possible embodiment illustrated for example in FIG. 1 or 1*a*, the plant 1 comprises a pick-up device 40 configured for picking up from the shaping work station 13, at the end of the closed-loop completion path 30 completed by the tyre being processed 20, a green tyre 41 decoupled from the respective forming drum 16. The green tyre 41 is adapted to be vulcanised in a vulcanisation unit 42 belonging to the plant 1, as illustrated in the figures or remotely arranged.

In accordance with one possible embodiment, the plant 1 comprises a plurality of transfer devices 29 (in the illustrated embodiment, four robotic arms and one translator) and can comprise an equivalent or different number of tyres being processed 20 arranged along the closed-loop completion path 30.

It must be underlined that the definition of first, second, third, fourth robotic arm does not imply a sequence and does not require that all four are simultaneously present in the same plant. Hence, plants may be provided with only one of the indicated robotic arms or different combinations from that described and illustrated, e.g. only the second and third robotic arm. In accordance with one possible embodiment, the plant 1 comprises a substitution work station 43 for the forming drums 16 arranged in proximity to the closed-loop completion path 30 and adapted to provide at least one entering forming drum 16*a* in substitution and to receive at least one exiting forming drum 16*b* (FIG. 1*b*).

Figure 1B:
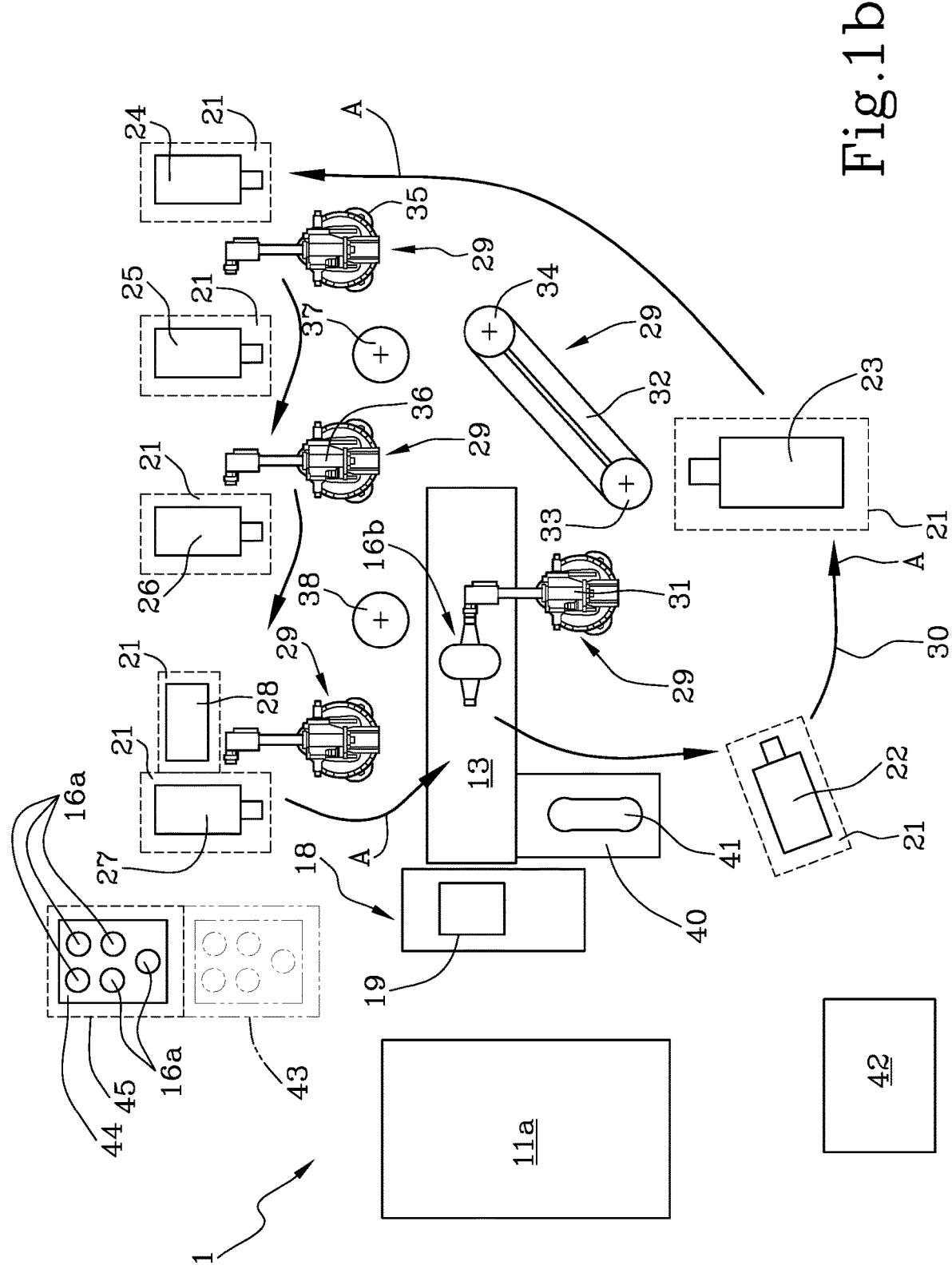
FIG. 1b schematically shows a top view of a further variant of the plant for building tyres of FIG. 1.

Preferably a same transfer device, which in the embodiment illustrated in FIG. 1*b* is represented by the fourth robotic arm 39, is configured for moving the exiting forming drum 16*b* away from the closed-loop completion path 30 by positioning it in the substitution work station 43 and for inserting the entering forming drum 16*a* in the closed-loop completion path 30 by picking it up from the substitution work station 43.

The substitution work station 43 is preferably arranged immediately before the shaping work station 13 according to a travel sense A of the closed-loop completion path 30.

In particular the plant 1 comprises a platform 44 adapted to receive a plurality of entering forming drums 16*a* in the substitution work station 43. Preferably the plant 1 comprises actuators, not illustrated, configured for automatically moving the platform 44 from a waiting work station 45 to the substitution work station 43.

During use, the plant 1 is adapted to operate according to a process for building tyres according to the present invention. One example of such process is described hereinbelow.

The process for building tyres according to the present invention for example provides for arranging, in the shaping work station 13, the radially-contracted forming drum 16. The contraction of the forming drum 16 occurs in the shaping work station 13 itself, according to the modes that will be subsequently described.

In addition, the process for building tyres according to the present invention provides for arranging a carcass sleeve 12 in the shaping work station 13. The carcass sleeve 12 can come from a carcass building line 11 arranged in the plant itself or from a storage 11*a* which receives the carcass sleeves 12 coming from a carcass building line, for example remote. In particular the forming drum 16 reaches the shaping work station 13 before the respective carcass sleeve 12, e.g. still being processed along the carcass building line 11 or still contained in the storage 11*a*, reaches the shaping work station 13 itself.

Figure 2:
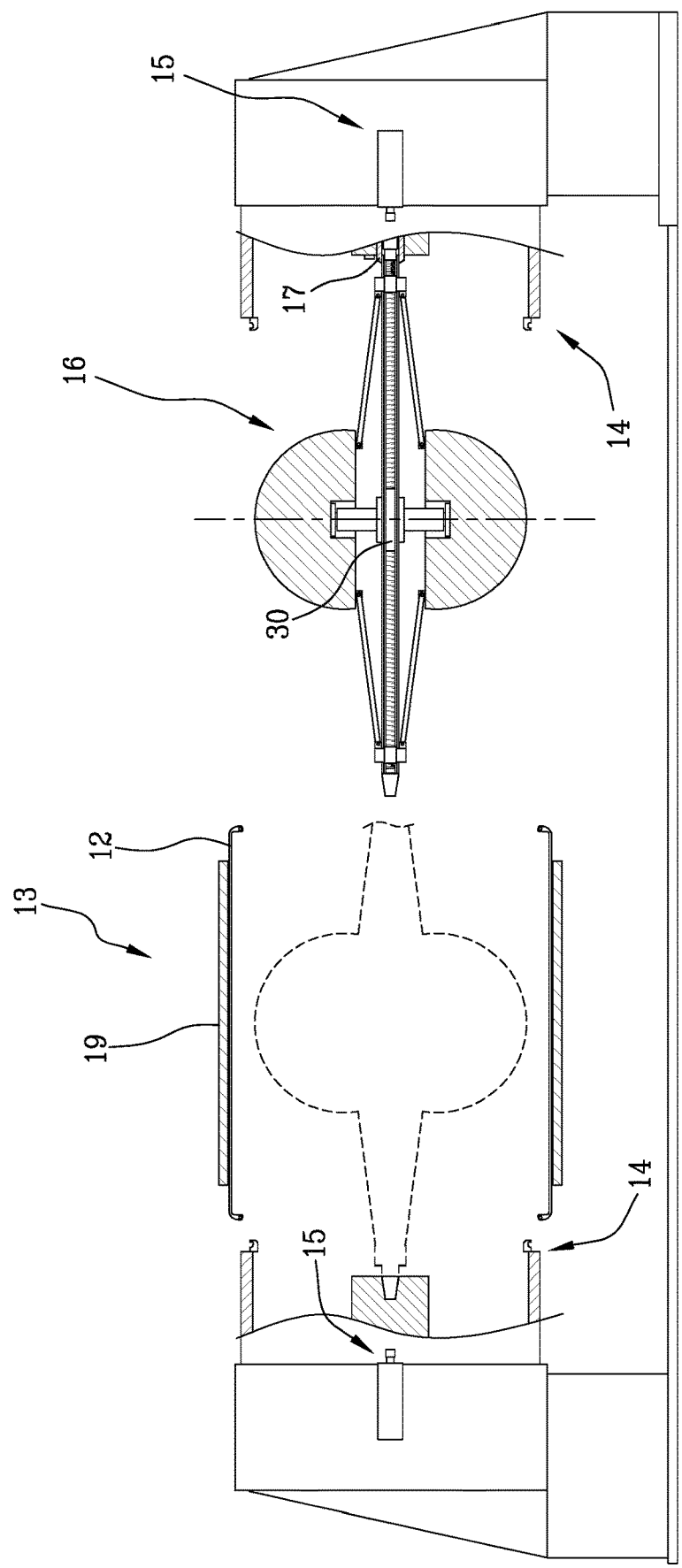
FIG. 2 schematically shows a side and partial section view of the shaping work station in an operative condition.

One of the possible modes for transferring the carcass sleeve 12 is illustrated in FIG. 2, in which provision is made such that the carcass sleeve 12 is first inserted, in a relation of axial alignment with the forming drum 16 (FIG. 2), and subsequently arranged around the forming drum 16, preferably following a movement of axial translation of the forming drum itself (FIG. 2, dashed line).

Figure 3:
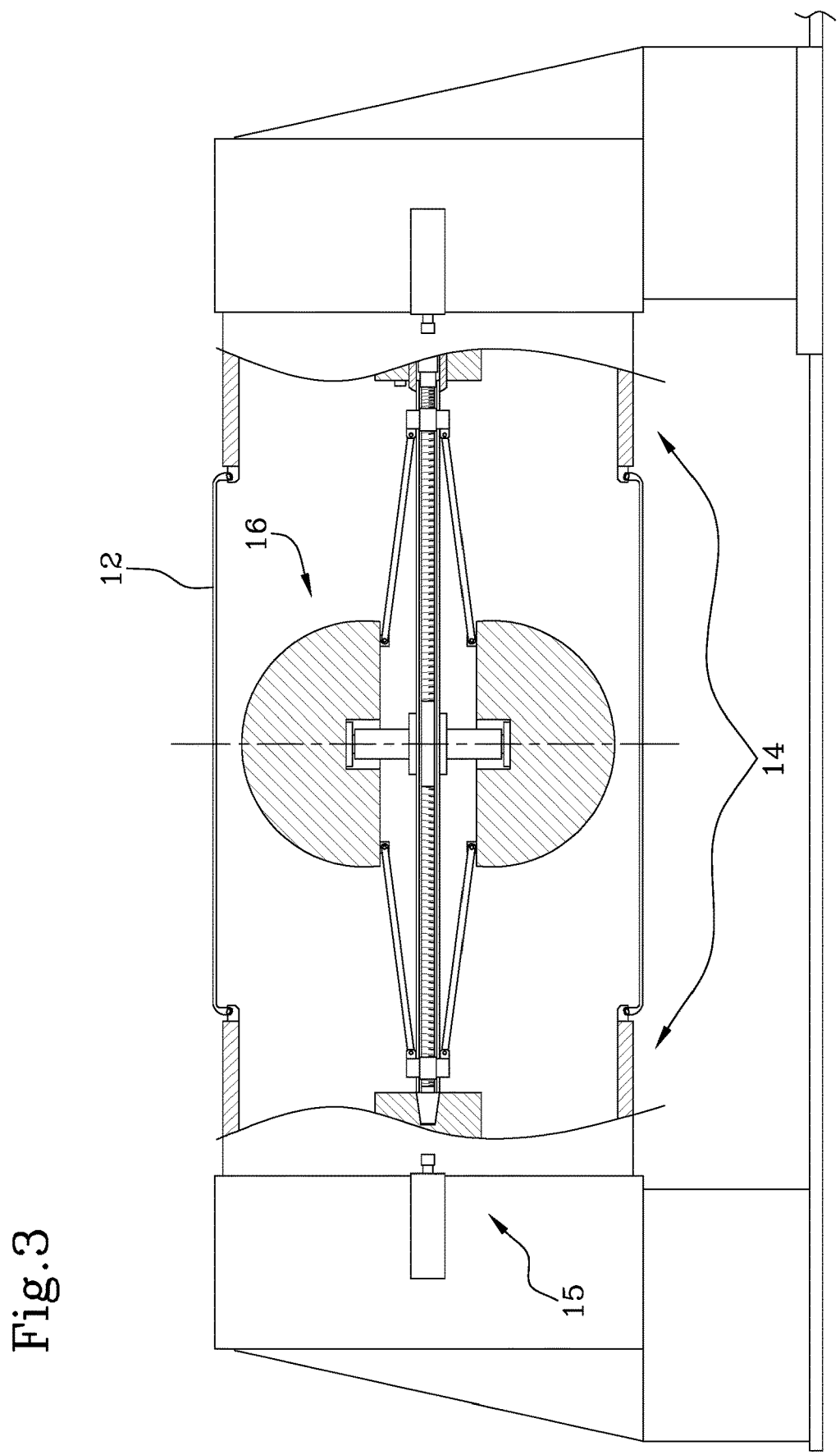
FIG. 3 schematically shows the work station of FIG. 2, in a subsequent operative condition.

The carcass sleeve 12 is stably constrained in the shaping work station 13 by the engagement devices 14 of the carcass sleeve 12 in a manner such that the load handling device 19 can disengage the carcass sleeve 12 and be moved away from the shaping work station 13 (FIG. 3).

Subsequently, provision is made for toroidally shaping the carcass sleeve 12. In order to shape the carcass sleeve 12, the shaping devices 15 can for example be driven so as to introduce pressurized air or another operating inflation fluid inside the carcass sleeve 12, simultaneously approaching the axially external ends of the carcass sleeve 12 constrained by the engagement devices 14.

Provision is also made for radially expanding the forming drum 16 and coupling the toroidally-shaped carcass sleeve 12 to the radially-expanded forming drum 16 defining the tyre being processed 20. In order to radially expand the forming drum 16, the actuator devices 17 operating in the shaping work station 13 can for example be activated.

According to the embodiment illustrated in the figures, before radially expanding the forming drum 16, provision is made for coaxially fitting the carcass sleeve 12 in radially external position with respect to the radially-contracted forming drum 16 arranged in the shaping work station 13.

According to one possible embodiment, the radial expansion of the shaping drum 16 can be controlled during shaping, when the carcass sleeve 12 starts to be radially expanded.

Preferably the shaping of the carcass sleeve 12 is executed without contact between the latter and the forming drum 16, at least until the forming drum 16 itself reaches the maximum radial expansion, upon attainment of the second operative condition thereof. In particular, it may be provided that upon reaching the pre-established maximum value of the diameter size of the carcass sleeve 12, the action of the shaping devices 15 is interrupted and the completion of the radial expansion of the forming drum 16 is enabled, bringing it into the second operative condition. Hence the coupling is enabled between the carcass sleeve 12 and the forming drum 16. Such coupling is verified by carrying an internal surface of the carcass sleeve 12 in a contact relationship against the radially external toroidal surface "S" of the forming drum 16.

Preferably, provision is made such that at the end of the shaping, the internal surface of the carcass sleeve 12 reaches a maximum diameter greater than the maximum diameter of the external surface of the expanded forming drum 16. The coupling can therefore be actuated following a slight radial contraction of the carcass sleeve 12, obtained for example due to an elastic contraction thereof following the evacuation of the operating fluid previously introduced during shaping.

Figure 4:
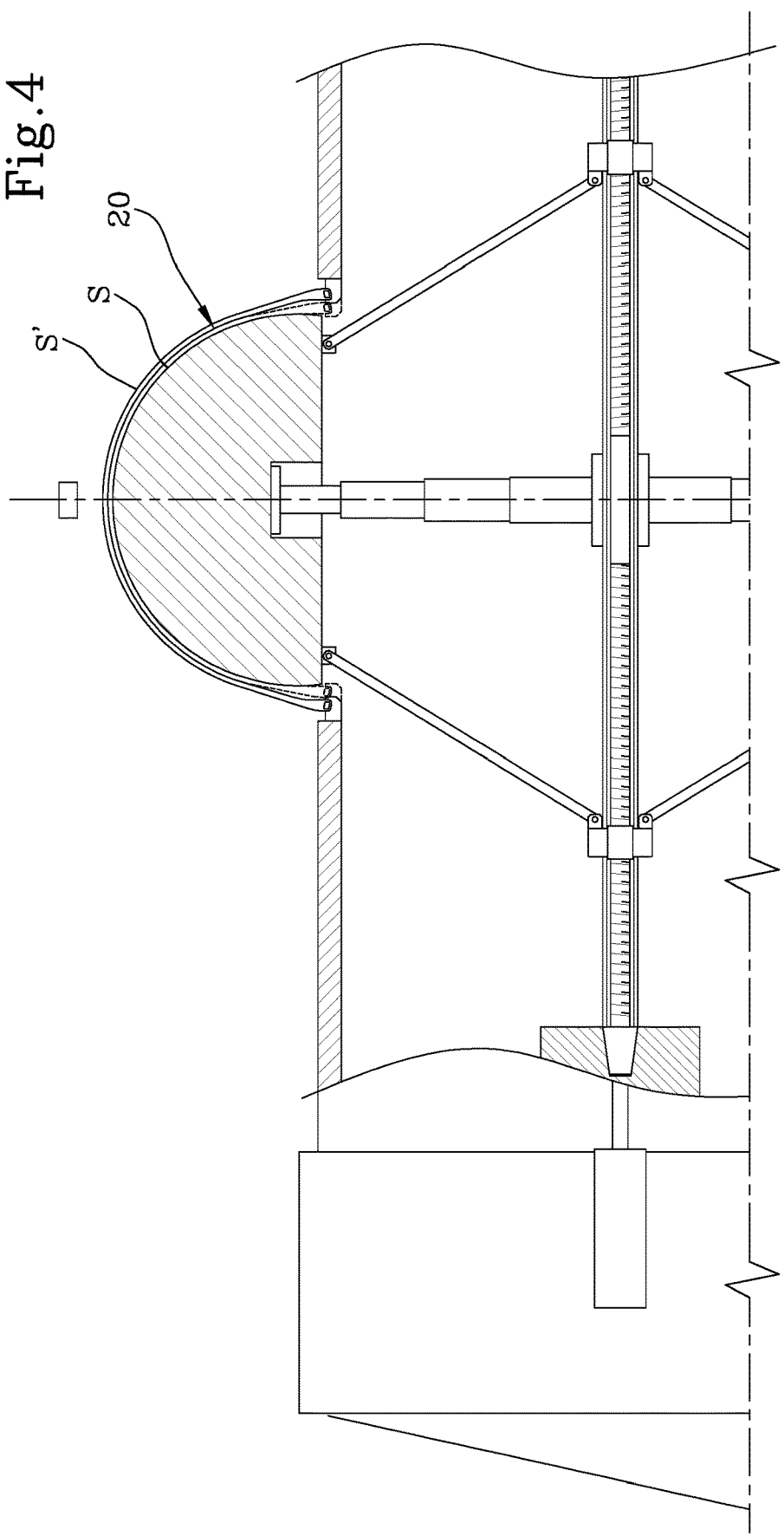
FIG. 4 schematically shows the work station of FIG. 3, in a subsequent operative condition.
Figure 5:
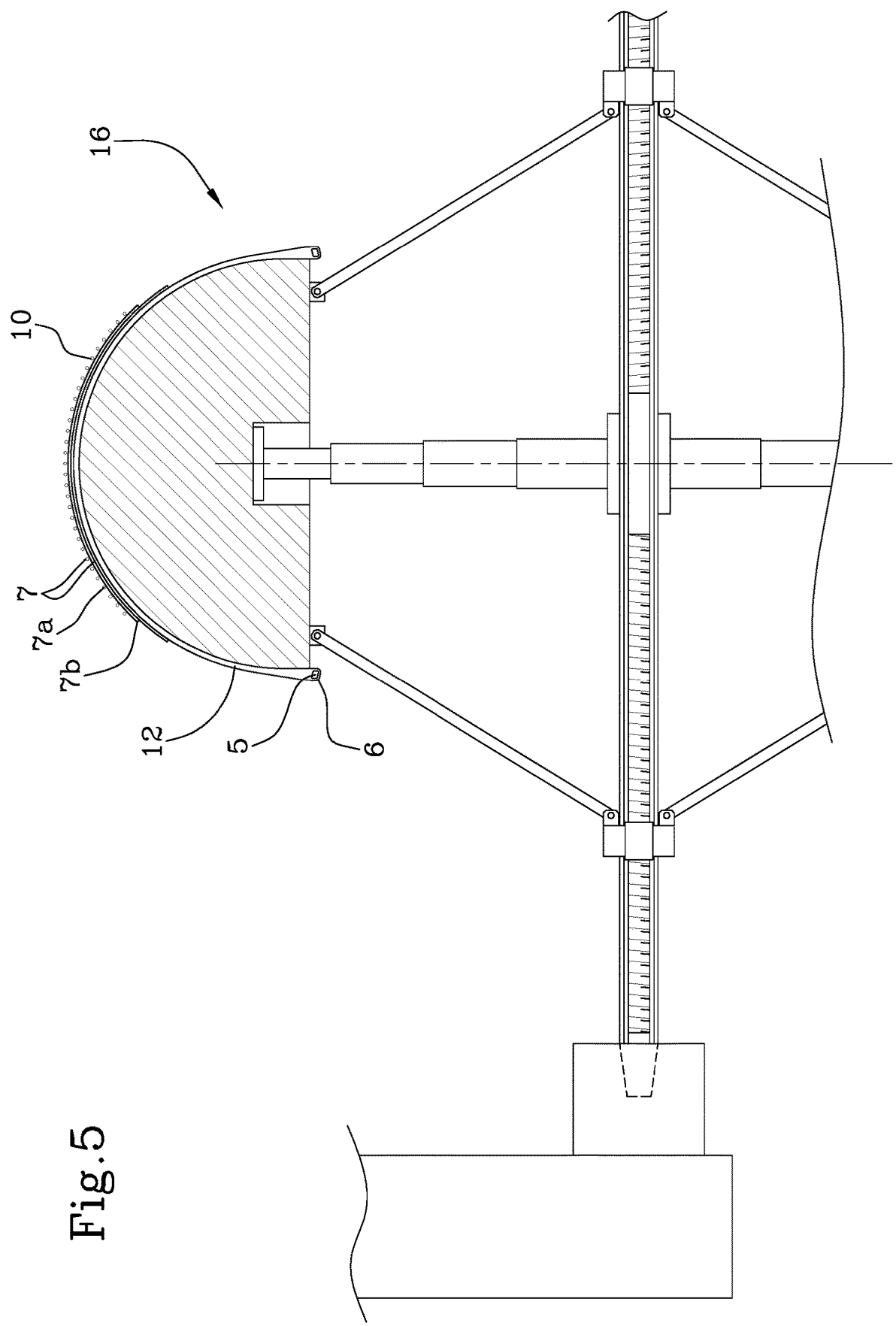
FIG. 5 schematically shows the work station of FIG. 4, in a subsequent operative condition.

Upon completed coupling, the engagement devices 14 disengage the shaped carcass sleeve 12, leaving it on the expanded forming drum 16 and thus obtaining the tyre being processed 20 (FIG. 4).

The forming drum 16 is then moved along the closed-loop completion path 30 which starts and ends at the shaping work station 13. During such movement along the closed-loop completion path 30, each component is shaped of the corresponding crown structure of the tyre being processed 20, in radially external position with respect to the aforesaid tyre being processed 20. In other words the toroidally-shaped carcass sleeve 12 is moved along the closed-loop completion path 30 coupled to the radially-expanded forming drum 16.

Along the closed-loop completion path 30, the tyre being processed 20 is arranged in proximity to at least one of the work stations 21, preferably a plurality of work stations 21 for building the components of the crown structure.

At the end of the closed-loop completion path 30, the tyre being processed 20 is once again placed in the shaping work station 13. In the shaping work station 13, the decoupling of the green tyre 41 from the forming drum 16 occurs so that the green tyre 41 can be picked up from the shaping work station 13. Preferably the decoupling of the green tyre 41 from the forming drum 16 occurs by radially contracting the forming drum 16 in the shaping work station 13. In this manner, the radially-contracted forming drum 16 is also arranged in the shaping work station 13 so as to allow starting a new cycle.

With regard to the building of the components of the crown structure, it is possible to proceed by winding at least one continuous elongated element according to circumferential coils that are axially approached and/or radially superimposed around the radially external surface S' of the tyre being processed 20. Such execution mode can be provided in particular if the component to be built is at least one from among:
the zero-degree layer 7a being part of the belt structure 7;
at least one portion (e.g. first portion 8a or second portion 8b or third portion 8c) of the tread band 8;
one or both sidewalls 9.

Alternatively, the building of the components of the crown structure can occur by laying a plurality of strip-like elements in a mutually approached relationship of the relative lengths, in a manner such that the longitudinal extension of each strip-like element is arranged transverse to the circumferential extension of the radially external surface S' of the tyre being processed 20. At the end of the building, the plurality of strip-like elements defines the component covering the entire circumferential extension of the tyre being processed 20. Such execution mode can be provided in particular if the component to be built is at least one belt layer 7b being part of the belt structure 7.

Hereinbelow, the transfer of the tyre being processed 20 along the closed-loop completion path 30 is described with reference to the plant illustrated in FIG. 1 or 1a. In order to allow the transfer of the tyre being processed 20 from the shaping work station 13, provision is made such that the forming drum 16 carrying the carcass sleeve 12 is projectingly supported, freeing the access to the first robotic arm 31 or to another suitable transfer device, which in turn projectingly engages the forming drum 16. The first robotic arm 31 also provides for suitably moving the forming drum 16 before the zero-degree layer building device 22 and/or to make the forming drum 16 available to the belt layer building device 23.

In the first case, the zero-degree layer 7a is therefore obtained by winding a continuous elongated reinforcement element according to circumferential coils 10 axially approached around the radially external surface "S" of the tyre being processed 20, while the forming drum 16 is driven in rotation and suitably moved by the first robotic arm 31.

A precise positioning of the single circumferential coils 10 of the zero-degree layer 7a is thus obtained, directly formed according to the design specifications of the tyre being processed 20, even when such profile has an accentuated transverse curvature, as can be for example typically encountered in tyres intended for motorcycles or other two-wheel vehicles. In the second case, the belt layer(s) 7b is/are applied to the tyre being processed 20, before or after the application of the zero-degree layer 7a or in the absence of such zero-degree layer 7a. The building of a belt layer 7b occurs by laying a plurality of strip-like elements in a mutually approached relationship of the relative lengths, in a manner such that the longitudinal extension of each strip-like element is arranged transverse to the circumferential extension of the radially external surface S' of the tyre being processed 20. At the end of the building, the plurality of strip-like elements defines the belt layer 7b covering the entire circumferential extension of the tyre being processed 20. Since each strip-like element comprises parallel textile or metallic cords, the corresponding belt layer 7b has such cords arranged according to an orientation that is tilted with respect to the circumferential extension direction of the tyre. The possible further belt layer 7b is built in the same manner but by arranging the strip-like elements crossed with respect to the previously-built belt layer, in a manner such that also the respective cords of belt layers 7b adjacent to each other are arranged crossed.

The transfer of the tyre being processed 20 between the zero-degree layer building device 22 and the belt layer building device 23 can be entrusted to the same first robotic arm 31, or to a further robotic arm, preferably anthropomorphic, or to a handling device of another type.

The tyre being processed 20 is then transferred to one or more of the first/second/third tread band portion building devices as a function of the type of tread band to be built, by means of the translator 32 and the second robotic arm 35 and/or the third robotic arm 36.

The transfer of the tyre being processed 20 to the work station 21 comprising the sidewall building device 27 and to the work station 21 comprising the label building device 28 can be entrusted to the same fourth robotic arm 39. In addition, the transfer of the tyre being processed 20 to the shaping work station 13 in order to close the closed-loop completion path 30 is entrusted once again to the same fourth robotic arm 39.

Finally, the pick-up device 40 picks up from the shaping work station 13, at the end of the closed-loop completion path 30, the green tyre 41 decoupled from the respective forming drum 16.

In FIGS. 1 and 1a, the moment is illustrated at which the green tyre 41 is picked up from the shaping work station 13 and a further carcass sleeve 12' is arranged in the shaping work station 13.

At this point, the cycle starts again, so that the further carcass sleeve 12' is toroidally shaped and coupled to the radially-contracted forming drum 16 that remained in the shaping work station 13, in order to obtain a further tyre being processed, not illustrated.

The aforesaid forming drum 16 is then moved once again along the closed-loop completion path 30 in an analogous or different manner as a function of the type of tyre to be obtained by building, along the closed-loop completion path 30, each component of a corresponding crown structure of the further tyre being processed in radially external position with respect to the aforesaid further tyre being processed.

Advantageously the plant 1 in normal operating conditions can manage a plurality of tyres being processed 20 corresponding or not to the number of transfer devices 29 configured for moving said forming drums 16 along the closed-loop completion path 30, by arranging them in sequence in proximity to the work stations 21.

In accordance with one possible embodiment of the plant 1, for example illustrated in FIG. 1b, provision can be made for idly moving, along at least one section of the closed-loop completion path 30, an exiting forming drum 16b decoupled from the carcass sleeve 12 and for moving it away from the closed-loop completion path 30. In addition, provision is made for inserting, in the closed-loop completion path 30, an entering forming drum 16a in substitution.

In particular, after having decoupled the green tyre from the exiting forming drum 16b at the shaping work station 13, the exiting forming drum 16b completes nearly the entire closed-loop completion path 30 until it is positioned in a passage station, preferably immediately before the shaping work station 13, according to the travel sense A. In particular the exiting forming drum 16b completes nearly the entire closed-loop completion path 30 until it is positioned in the fourth passage station 38.

Preferably a same transfer device is configured for moving the exiting forming drum 16b away from the closed-loop completion path 30 and for inserting the entering forming drum 16a in substitution in the closed-loop completion path 30.

As is for example illustrated in FIG. 1b, the exiting forming drum 16b is moved away, during the travel along the closed-loop completion path 30 immediately before the shaping work station 13, according to the travel sense A of the closed-loop completion path 30. In addition, the entering forming drum 16a in substitution is inserted in the closed-loop completion path 30 at the shaping work station 13.

In particular, while the exiting forming drum 16b is waiting in the fourth passage station 38, the fourth robotic arm 39 picks up an entering forming drum 16a from the substitution work station 43 and introduces it into the closed-loop completion path 30 at the shaping work station 13. The entering forming drum 16a can then start a new cycle, as described above. The same fourth robotic arm 39 picks up the exiting forming drum 16b from the fourth passage station 38 and transfers it into the substitution work station 43.

In the same manner, all the forming drums can be substituted, simultaneously operating in the plant 1.

In order to carry out the substitution, provision can be made for arranging the platform 44 adapted to receive a plurality of entering forming drums 16a in the substitution work station 43. In particular provision is made for arranging the platform 44 adapted to receive a plurality of entering forming drums 16a in the waiting work station 45 and for automatically moving or not moving the platform 44 from the waiting work station 45 to the substitution work station 43.

The invention claimed is:

1. A process for building tyres comprising:
arranging a carcass sleeve in a shaping work station;
toroidally shaping said carcass sleeve and coupling said carcass sleeve to a radially expandable/contractible toroidal forming drum defining a tyre being processed;
moving said forming drum along a closed-loop completion path having an initial work station and a final work station coinciding with said shaping work station;
building, along said closed-loop completion path, each component of a corresponding crown structure of the tyre being processed in a radially external position with respect to the aforesaid tyre being processed, thereby obtaining a green tyre;
decoupling said green tyre from said forming drum in said shaping work station, at an end of the closed-loop completion path completed by said forming drum; and
picking up said green tyre.

2. The process for building tyres as claimed in claim 1, wherein picking up said green tyre occurs in said shaping work station.

3. The process for building tyres as claimed in claim 1 comprising:
arranging, in said shaping work station, said forming drum in a radially-contracted position;
radially expanding said forming drum; and
coupling said toroidally-shaped carcass sleeve to the radially-expanded forming drum.

4. The process for building tyres as claimed in claim 3, comprising coaxially fitting said carcass sleeve in a radially external position with respect to said forming drum arranged in said shaping work station in the radially-contracted position, before radially expanding said forming drum.

5. The process for building tyres as claimed in claim 1, wherein said toroidally-shaped carcass sleeve is moved along said closed-loop completion path coupled to said forming drum in a radially-expanded position.

6. The process for building tyres as claimed in claim 5, comprising radially contracting said forming drum in order to decouple said green tyre.

7. The process for building tyres as claimed in claim 1, wherein, along said closed-loop completion path, said tyre being processed is arranged in proximity to a plurality of work stations, each work station being configured for building at least one portion of a component of said crown structure.

8. The process for building tyres as claimed in claim 7, wherein said component of the crown structure is selected from at least one of: a component of a belt structure, a tread band, and a sidewall.

9. The process for building tyres as claimed in claim 1, wherein at least one component of said crown structure is built by winding at least one continuous elongated element according to circumferential coils that are axially approached and/or radially superimposed around a radially external surface of the tyre being processed.

10. The process for building tyres as claimed in claim 9, wherein said component is selected from at least one of: a zero-degree layer belonging to a belt structure, at least one portion of a tread band, and a sidewall.

11. The process for building tyres as claimed in claim 1, wherein at least one component of said crown structure is built by laying a plurality of strip-like elements in a mutually approached relationship of relative lengths, in a manner such that a longitudinal extension of each strip-like element is arranged transverse to a circumferential extension of a radially external surface of the tyre being processed, said plurality of strip-like elements defining said component covering an entire circumferential extension of the tyre being processed.

12. The process for building tyres as claimed in claim 11, wherein said component is at least one belt layer belonging to a belt structure.

13. The process for building tyres as claimed in claim 1, comprising moving, along at least one section of said closed-loop completion path, an existing forming drum that is not coupled to a tyre being processed; and
moving away, from the closed-loop completion path, said exiting forming drum, and inserting in said closed-loop completion path an entering forming drum in substitution.

14. The process for building tyres as claimed in claim 13, wherein a same transfer device is configured for moving said exiting forming drum away from the closed-loop completion path and for inserting said entering forming drum in substitution in said closed-loop completion path.

15. The process for building tyres as claimed in claim 13, wherein said exiting forming drum is moved away, during travel along the closed-loop completion path immediately before the shaping work station, according to a travel direction of the closed-loop completion path, and said entering forming drum in substitution is inserted in said closed-loop completion path at said shaping work station.

16. The process for building tyres as claimed in claim 13, comprising arranging a platform adapted to receive a plurality of entering forming drums in a substitution work station arranged in proximity to said closed-loop completion path.

17. The process for building tyres as claimed in claim 16, comprising automatically moving said platform from a waiting work station to said substitution work station.

18. The process for building tyres as claimed in claim 1, wherein an expanded forming drum has a curvature ratio between about 0.15 and about 0.45.

19. The process for building tyres as claimed in claim 1, comprising:
   arranging a further carcass sleeve in the shaping work station after the green tyre has been decoupled from said forming drum and picked up;
   toroidally shaping said further carcass sleeve and coupling said further carcass sleeve to said forming drum in the shaping work station in order to obtain a further tyre being processed;
   moving said forming drum once again along said closed-loop completion path; and
   building, along said closed-loop completion path, each component of a corresponding crown structure of the further tyre being processed in a radially external position with respect to the aforesaid further tyre being processed.

20. A plant for building tyres, comprising:
   a shaping work station configured for receiving a carcass sleeve;
   at least one radially expandable/contractible toroidal forming drum engageable in the shaping work station;
   at least one work station configured for building at least one portion of a component of a crown structure on a radially external surface of a tyre being processed, defined starting from the carcass sleeve that is shaped and coupled to the forming drum;
   transfer devices configured for moving said forming drum along a closed-loop completion path and arranging said forming drum in sequence in proximity to said at least one work station in order to obtain a green tyre, said closed-loop completion path being extended from an initial work station to a final work station coinciding with said shaping work station; and
   a pick-up device configured for picking up said green tyre decoupled from a respective forming drum from the shaping work station, at an end of the closed-loop completion path completed by said forming drum.

21. The plant for building tyres as claimed in claim 20, comprising actuator devices operating in the shaping work station in order to radially expand the forming drum inside the carcass sleeve and in order to radially contract the forming drum inside the green tyre.

22. The plant for building tyres as claimed in claim 20, comprising a load device configured for arranging said carcass sleeve in said shaping work station.

23. The plant for building tyres as claimed in claim 20, comprising a substitution work station for substitution of forming drums arranged in proximity to said closed-loop completion path and adapted to provide at least one entering forming drum in substitution and to receive at least one exiting forming drum.

24. The plant for building tyres as claimed in claim 23, wherein a same transfer device is configured for moving an exiting forming drum away from the closed-loop completion path by positioning the exiting forming drum in the substitution work station and for inserting an entering forming drum in said closed-loop completion path by picking said entering forming drum up from said substitution work station.

25. The plant for building tyres as claimed in claim 23, wherein said substitution work station is arranged immediately before the shaping work station according to a travel direction of the closed-loop completion path.

26. The plant for building tyres as claimed in claim 23, comprising a platform adapted to receive a plurality of entering forming drums in said substitution work station.

27. The plant for building tyres as claimed in claim 26, comprising actuators configured for automatically moving said platform from a waiting work station to said substitution work station.

28. The plant for building tyres as claimed in claim 20, wherein the expanded forming drum has a curvature ratio between about 0.15 and about 0.45 when in an expanded position.

29. The plant for building tyres as claimed in claim 20, wherein said at least one work station comprises at least one building device selected from: a zero-degree layer building device, a belt layer building device, a first tread band portion building device, a second tread band portion building device, a third tread band portion building device, a sidewall building device, and a label building device.

30. The plant for building tyres as claimed in claim 20, wherein said at least one work station comprises a zero-degree layer building device comprising a spiraling unit configured for winding a rubber-covered cord or a continuous elongated reinforcement element according to circumferential coils that are axially approached in mutual contact, in a radially external position around the tyre being processed, while the forming drum is driven in rotation and suitably moved in order to distribute the circumferential coils according to a predefined scheme.

31. The plant for building tyres as claimed in claim 20, wherein said at least one work station comprises a building device selected from: a first tread band portion building device, a second tread band portion building device, a third tread band portion building device, and a sidewall building device, each said building device comprising a spiraling unit configured for winding at least one continuous elongated element made of elastomeric material according to circumferential coils that are axially approached in mutual contact and/or radially superimposed, in a radially external position around the tyre being processed, while the forming drum is driven in rotation and suitably moved in order to distribute the circumferential coils according to a predefined scheme.

32. The plant for building tyres as claimed in claim 20, wherein said at least one work station comprises a belt layer building device comprising a deposition unit configured for laying a plurality of strip-like elements in a mutually approached relationship of relative lengths, in a manner such that a longitudinal extension of each strip-like element is arranged transverse to a circumferential extension of a radially external surface of the tyre being processed and that the plurality of strip-like elements defines a belt layer covering the entire circumferential extension of the tyre being processed.

33. The plant for building tyres as claimed in claim 32, wherein the deposition unit is configured for building a plurality of belt layers by arranging the strip-like elements crossed with respect to a previously-built belt layer.

34. The plant for building tyres as claimed in claim 20, wherein said transfer devices comprise at least one anthropomorphic robotic arm.

35. The plant for building tyres as claimed in claim 20, wherein said transfer devices comprise at least one translator.

* * * * *